United States Patent [19]
Goethert

[11] 3,753,616
[45] Aug. 21, 1973

[54] LASER DOPPLER VELOCIMETER DETECTOR

[75] Inventor: Winfried H. Goethert, Tullahoma, Tenn.

[73] Assignee: The United States of America as represented by the Secretary of the Air Force, Washington, D.C.

[22] Filed: Nov. 22, 1971

[21] Appl. No.: 200,718

[52] U.S. Cl. ................................................. 356/28
[51] Int. Cl. ............................................. G01p 3/36
[58] Field of Search ....................... 356/28; 250/225

[56] References Cited
UNITED STATES PATENTS
3,215,840  11/1965  Buhrer ............................. 250/199

OTHER PUBLICATIONS
Brayton et al., Proc. 16th International Aerospace Instr. Symposium, May 1970, pp. 14–26.

Primary Examiner—Benjamin A. Borchelt
Assistant Examiner—S. C. Buczinski
Attorney—Harry A. Herbert, Jr. et al.

[57] ABSTRACT

A laser doppler velocimeter detector for determining velocity information in flow fields in which a laser beam utilized in the flow field is split into a pair of beams, one of which has its plane of polarization rotated 90°. A portion from each of the oppositely polarized beams is mixed to produce the desired doppler information. Polarization beam splitting is provided producing two beams, each containing doppler shifted information. Each of the beams is detected to provide a pair of representative electrical signals, one of which is subsequently inverted and added to the uninverted to result in a signal having only the frequency content of the original doppler information.

2 Claims, 2 Drawing Figures

INVENTOR.
WINFRIED H. GOETHERT

LASER DOPPLER VELOCIMETER DETECTOR

BACKGROUND OF THE INVENTION

This invention relates to a laser velocimeter and more particularly a balanced detector for a laser doppler velocimeter.

The laser velocimeter method for determining velocity information in flow fields has been well established. Under very low particle seeding densities, the doppler information is in the form of a data burst produced by single particles traversing the region of interest. The data burst consists of two components, the alternating portion and the non-alternating portion. The first task of a data processor is to remove the non-alternating portion such that the alternating portion remains to be processed by a frequency analyzer. A method of separating the two components by an optical technique is provided by the present invention. This is valuable to data processing since electronic methods for separating the components become difficult, if not impossible, at high frequencies, in addition to greatly attenuating the original signal.

SUMMARY OF THE INVENTION

A laser velocimeter balanced detector is provided. The laser beam utilized in a flow field is split into a pair of equally intense beams, one of which has its plane of polarization rotated 90°. The two beams are focused and cross over at a common point. Light scattered out therefrom is composed of two components with one beam having its plane of rotation rotated by 90°. Some of the scattered light is collected and passed through a polarization beam splitter having been rotated by 45°. By rotating this polarization beam splitter to approximately 45°, a portion from each oppositely polarized beam is mixed to produce the desired doppler information. Since the polarization beam splitter produced two beams each containing the doppler shifted information, two associated detectors provide the doppler information. The polarization beam splitter produces a 180° optical phase shift between the two beams which in turn results in a 180° phase shift between the two detected doppler shifted signals. One of the electrical signals is inverted to provide a 180° phase shift in the doppler frequency. The electrical inversion of one signal makes the non-alternating portion of the signal opposite of that produced by the non-inverted signal. These two electrical signals are added producing only the frequency content of the original doppler information.

An object of the invention is to provide a balanced detector for a laser velocimeter.

DETAILED DESCRIPTION OF PREFERRED EMBODIMENT

Figure 1:
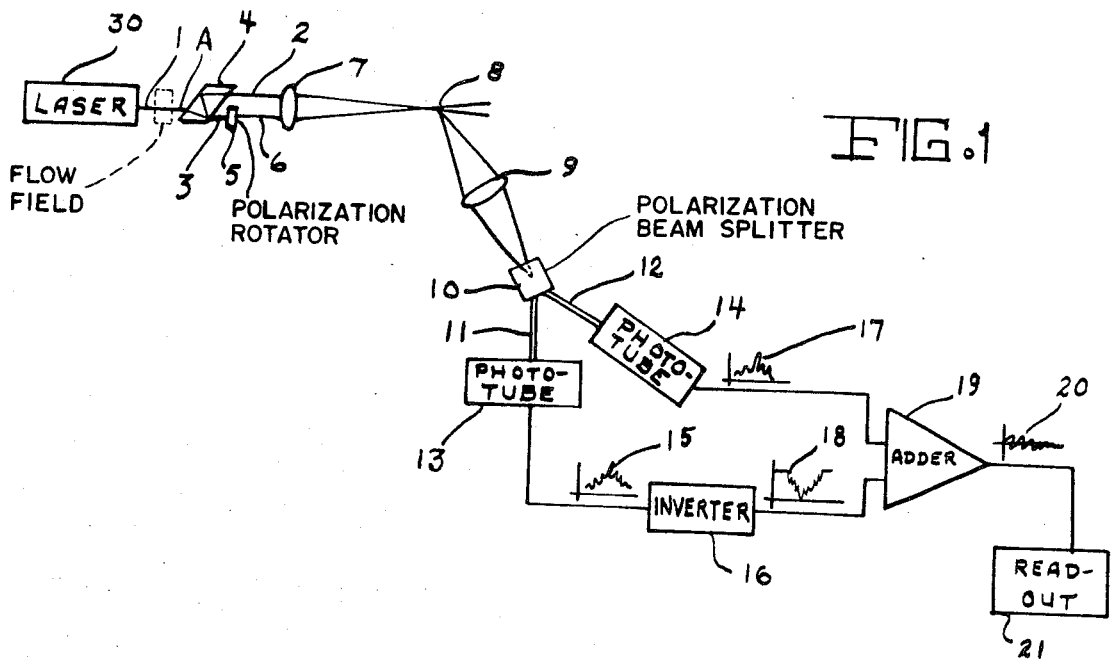
FIG. 1 shows the balanced detector for laser doppler velocimeter of the present invention.
Figure 2:
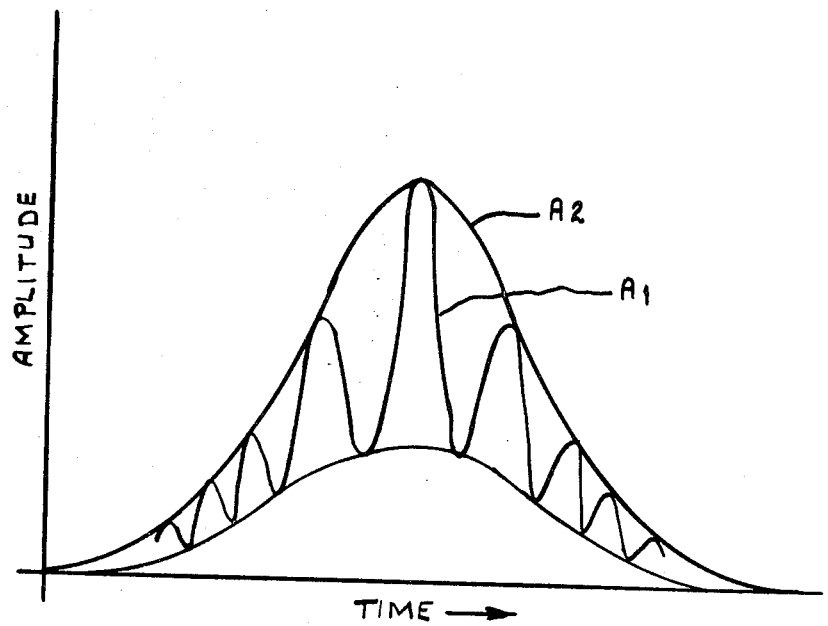
FIG. 2 illustrates in curve form the doppler velocity information in flow fields.

Referring in detail to FIG. 1, there is shown laser 30 providing laser beam 1 which may be utilized for determining velocity information in flow fields. Under very low particle seeding densities the doppler information as shown in FIG. 2 is in the form of data burst A. the data burst consists of two components, the alternating portion A1 and the non-alternating portion A2. Laser beam 1 may be passed through a flow field. Laser beam 1 is split into two equally intense beams 2 and 3 by conventional beam splitter 4. Beam 3 has its plane of polarization rotated by 90 degrees which is effected by conventional polarization rotator 5 to provide beam 6. Beams 2 and 6 are made to focus by lens 7 and cross over at common point 8. Light scattered out of region 8 is composed of two components with one beam having its plane of polarization rotated by 90 degrees. This scattered light is received by conventional collecting lens 9 placed at any convenient point. Since it is only necessary to collect the scattered light by lens 9, the light is passed through conventional polarization beam splitter 10 having been rotated by 45°. By rotating this polarization beam splitter to approximately 45°, a portion from each polarized beam is mixed to produce the desired doppler information. Since polarization beam splitter 10 produced two beams 11 and 12, each containing the doppler shifted information, two phototubes 13 and 14, respectively, are employed to detect doppler information. The polarization beam splitter necessarily produces (due to the classic laws of optics) a 180° phase shift between the two beams emanating from the beam splitter. This produces a 180° phase shift between the two doppler shifted signals detected by the phototubes. One of the electrical signals 15 is electrically inverted by inverter 16 (sign change from negative to positive) which produces a 180° phase shift in the doppler frequency. The electrical inversion of signal 15 makes the non-alternating portion of signal 18 opposite of that produced by the non-inverted signal 17. These two electrical signals 17 and 18 are then added electrically by adder 19 producing only the frequency content of the original doppler information. This signal 20 is then sent to electronic readout 21 for final data processing.

What is claimed is:

1. A balanced detector for a laser doppler velocimeter comprising means for generating a single laser beam for utilization in determining velocity information in flow fields, means to split said single laser beam into first and second equally intense beams, means to rotate the plane of polarization of said first beam 90° to provide a third beam, means to focus said second and third beam to cross over at a common point with light scattering out of the region of said common point, said scattered light being composed of two components with one beam having its plane of polarization rotated by 90°, means to collect said scattered light at a preselected position, polarization beam splitter means passing the collected light, said polarization beam splitter means rotating said passed collected light 45° operating to mix a portion of each oppositely polarized beam to produce doppler information in the form of fourth and fifth beams, first and second phototube means detecting said fourth and fifth beams to provide first and second electrical signals, respectively, means to invert electrically said first electrical signals to provide a third electrical signal, and means to add said second and third electrical signal to produce only the frequency content of said doppler information.

2. A balanced detector as described in claim 1 further including readout means receiving the output signal of said adding means.

* * * * *